United States Patent [19]

Wason

[11] Patent Number: 5,751,927
[45] Date of Patent: May 12, 1998

[54] METHOD AND APPARATUS FOR PRODUCING THREE DIMENSIONAL DISPLAYS ON A TWO DIMENSIONAL SURFACE

[76] Inventor: Thomas D. Wason, 715 W. Johnson St., Raleigh, N.C. 27603

[21] Appl. No.: 491,280

[22] Filed: Jun. 19, 1995

Related U.S. Application Data

[63] Continuation of Ser. No. 675,439, Mar. 26, 1991, abandoned.

[51] Int. Cl.⁶ .............. G06F 15/00; H04N 13/00; H04N 13/02
[52] U.S. Cl. .............. 395/119; 348/42; 348/44; 348/46
[58] Field of Search .............. 395/119, 129, 395/133, 161; 348/42, 43, 44, 45, 46, 51

[56] References Cited

U.S. PATENT DOCUMENTS

| | | | |
|---|---|---|---|
| 3,433,561 | 3/1969 | Jacobsen | 352/60 |
| 3,731,606 | 5/1973 | Geoffrey | 354/120 |
| 4,012,116 | 3/1977 | Yevick | 359/465 |
| 4,111,695 | 9/1978 | Yevick | 430/494 |
| 4,303,316 | 12/1981 | McElveen | 352/57 |
| 4,420,230 | 12/1983 | McElveen | 352/43 |
| 4,535,354 | 8/1985 | Rickert | 348/52 |
| 4,567,513 | 1/1986 | Imsand | 348/55 |
| 4,654,699 | 3/1987 | Medina | 348/42 |
| 4,740,836 | 4/1988 | Craig | 348/49 |
| 4,751,616 | 6/1988 | Haisena et al. | 348/59 |
| 4,757,380 | 7/1988 | Sonets et al. | 348/42 |
| 4,896,210 | 1/1990 | Brokenshire | 358/88 |

OTHER PUBLICATIONS

"Sight and Mind"; Lloyd Kaufman; Oxford University Press, 1974, pp. 234–241.

Primary Examiner—Raymond J. Bayerl
Assistant Examiner—Ba Huynh

[57] ABSTRACT

A process is used to produce the visual perception of spatial structure through manipulations of images displayed on an essentially flat screen. The same images are presented simultaneously to both eyes. The images are derived from small discrete shifts in the local apparent viewing angle; these shifts occur perceptually in direction and time, like saccades. The nature of the shifts, the interrelationship of the magnitude of the shifts and the duration between shifts are selected to convey motion parallax sensations to a viewer. The process can be applied to cathode-ray displays, motion pictures, and similar essentially flat displays.

71 Claims, 6 Drawing Sheets

FIG. 5
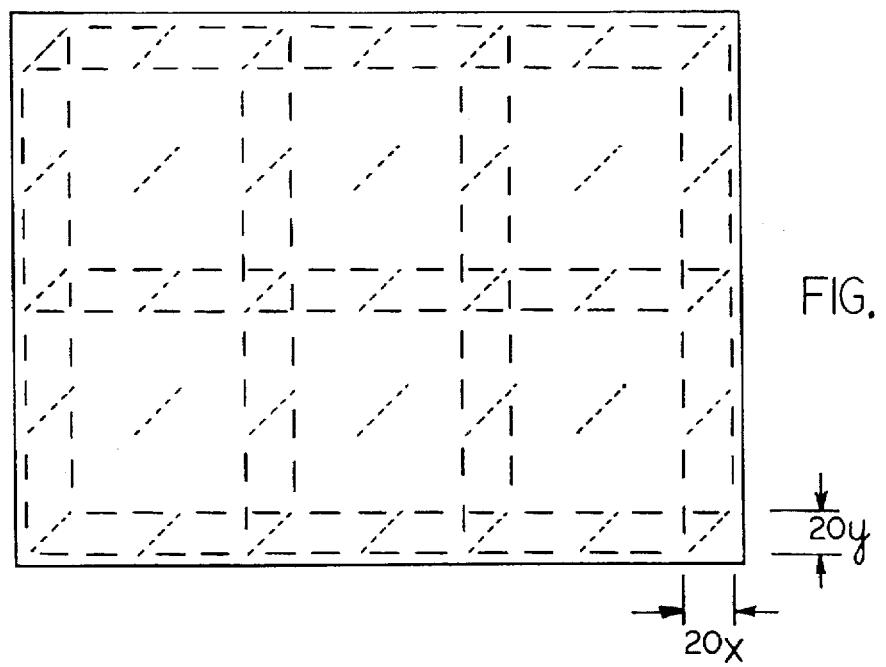
FIG. 7
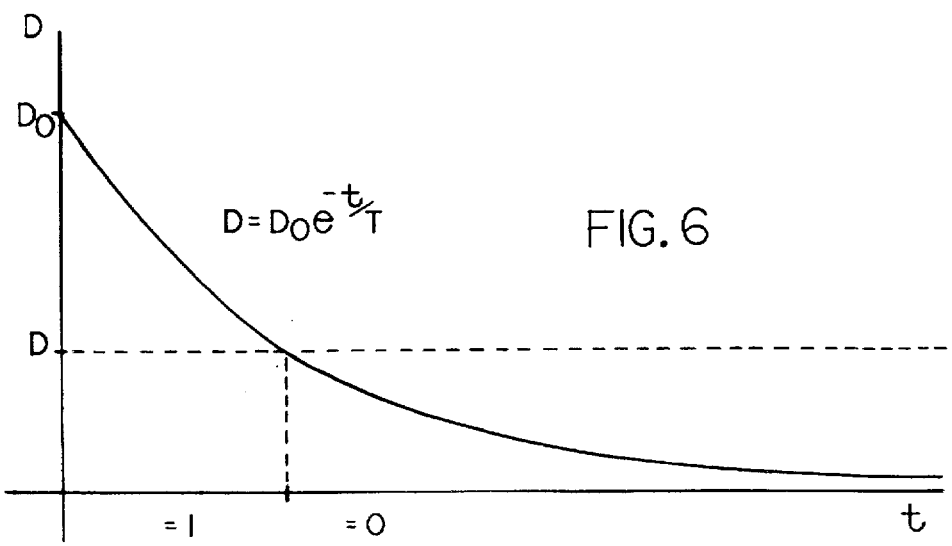
FIG. 6

FIG. 8
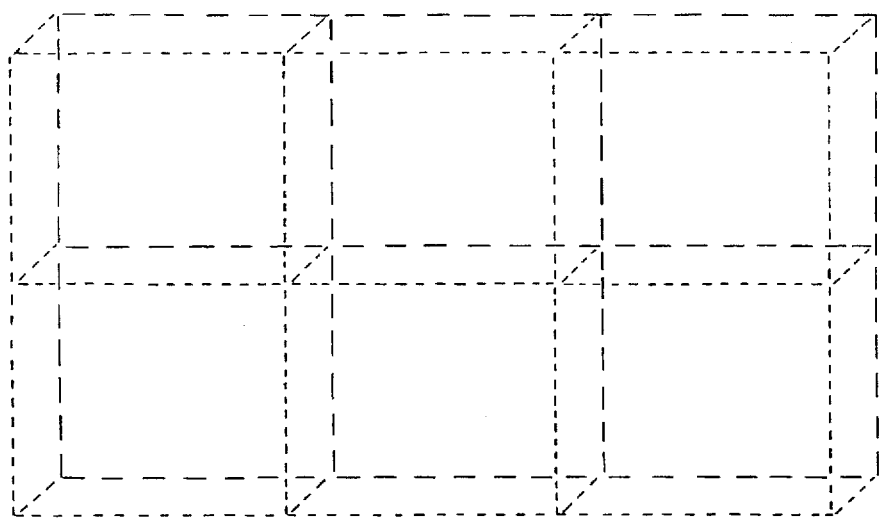
FIG. 9
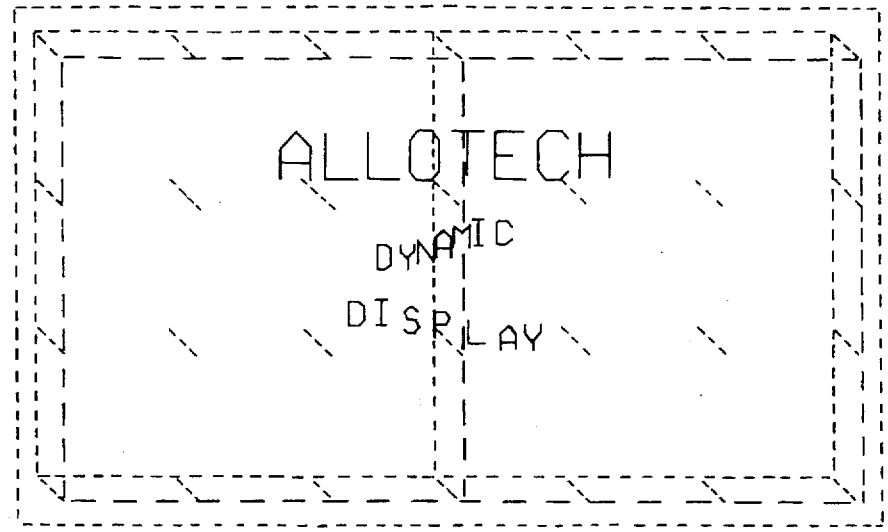
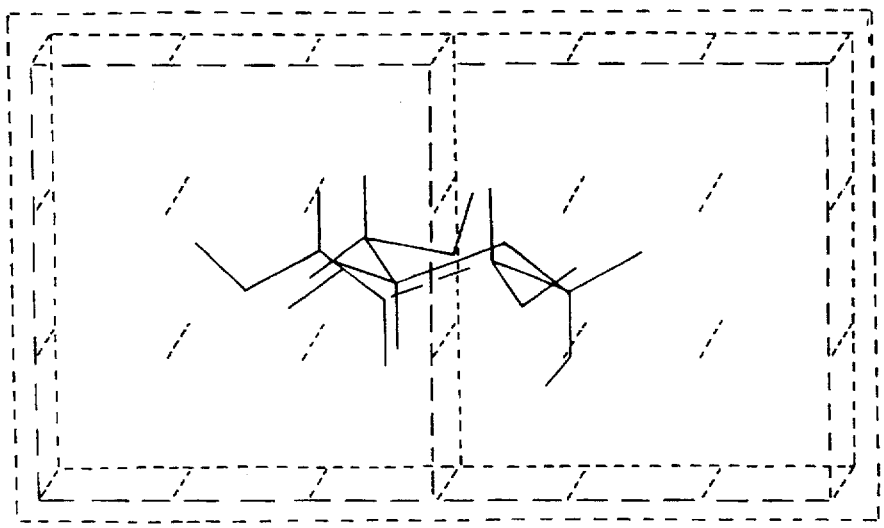
FIG. 10

METHOD AND APPARATUS FOR PRODUCING THREE DIMENSIONAL DISPLAYS ON A TWO DIMENSIONAL SURFACE

This application is a continuation of application Ser. No. 07/675,439 filed Mar. 26, 1991, now abandoned.

BACKGROUND OF THE INVENTION

This invention provides a method for producing three-dimensional visual displays. The perception is of space and spatial structure. This method can be applied to images projected onto essentially flat screens, such as cathode ray tubes (CRTs) and motion picture screens. No special viewing or projection optics or equipment are required.

Graphic display of information frequently suffers from the restriction of being displayed in only two dimensions. Air traffic controllers must direct airplanes which are flying in three-dimensional space by looking at a two-dimensional display. Molecular biologists, geologists, engineers, architects, scientists, planners, and medical doctors all deal with three-dimensional structures, and must visualize three-dimensional structures. Many attempts have been made to produce useable three-dimensional displays which require no special visual aids for the viewer, with varying degrees of success. There are two basic types of display: stereoscopic and monoptic.

In stereoscopic vision, each eye has a slightly different view of a scene. This produces the visual perception of three-dimensional form and structure. Normal stereoscopic vision can be produced by presenting stereopairs of images of a scene; each of the two eyes is presented with a separate image. Many techniques have been developed for presenting two different images to each of the two eyes. Many of these techniques have been outlined by T. Okoshi in *Three-Dimensional Imaging Techniques* (Academic Press, New York, 1979).

The Wheatstone stereoscope uses optical wedges (prisms), often in combination with magnifying lenses, to present a pair of side-by-side stereopair pictures as separate images to each eye. This same idea has been used in many forms, often using transparent pictures or slides as the stereopairs. U.S. Pat. No. 4,740,836 Craig discloses a video system which presents the two stereo views on a cathode ray tube (e.g., television screen) with one image above the other on the screen. The images are viewed through optics which produce appropriate angular deviations in the optical paths to the two eyes such that a single fused stereoscopic view results. Typical methods for autostereoscopic viewing (needing no viewer worn optics) which nevertheless provide separate images to the two eyes are taught in the following U.S. Pat. Nos.:

| | |
|---|---|
| 3,520,588 | Salyer et al. |
| 3,731,606 | Geoffray |
| 3,960,563 | Lo et al. |
| 4,012,116 | Yevick |
| 4,111,695 | Yevick |
| 4,535,354 | Rickert |
| 4,571,616 | Haisma et al. |

The monoptic technique for three dimensional display forms a single image viewed by both eyes simultaneously. McElveen, in U.S. Pat. Nos. 4,303,316 and 4,420,230 teaches motion picture methods for presenting the two stereo images in various forms of alternation to achieve a stereoscopic effect. McElveen uses a motion picture system which divides the lens aperture into two horizontally separated subapertures. This produces two images which differ slightly in viewing angle. When viewed (as a motion picture or through video means) a three-dimensional perception results, along with a perceived alternation of images.

U.S. Pat. No. 4,567,513 to Imsand teaches a method for a three-dimensional television system which uses electronic processing of the two separate stereopair images. As the two images comprising a stereo pair have differing lateral spacing between object images, the object images do not normally coincide on the viewing surface when displayed. The images of objects are matched in the display by electronically identifying them using edge detection techniques and laterally shifting them appropriately, such that the two images of an object are superimposed on the same location on the screen. The views are alternated. For objects with well-defined spatial structures (form), this produces the perception of form for those objects. This process has the limitation that it requires extensive image analysis and can operate only on scenes with small well-defined image structures. Extended structures, such as large molecules or a field of grass, can not be processed.

Smets et al. in U.S. Pat. No. 4,757,380 and other publications (e.g., *Perceptual and Motor Skills*, 1987, 64, 1023–1034 and *Perceptual and Motor Skills*, 1987, 64, 203–216) teaches a method for producing the perception of space in a single image by yoking the apparent rotation of the image to the head motion of the observer. This method relies on motion parallax, the change in the image as the observing orientation changes. It has the advantage of requiring only one image as motion parallax alone can produce a strong spatial perception in the absence of stereoscopic parallax. This method requires that a continuous stream of images be generated for a specific observer. As scientific visualization (graphic images of scientific and/or technical processes and/or objects) is often viewed by only one person at a time, this method has some value, but requires monitoring the viewer's head position. If the images are computer generated, such yoking of the motion of a video camera to the observer's head motion is impossible.

None of these techniques provide a means and method for displaying three dimensional images on a single, conventional screen to be viewed by both eyes of a viewer and providing a naked-eyed viewer with perceptible three dimensional information and images.

SUMMARY OF THE INVENTION

The present invention overcomes the deficiencies in previous methods by providing a means and method of producing the perception of three-dimensional structure in the observer by working with the human visual system. Images on an essentially flat display screen are manipulated to produce this perception without the use of any additional optics, special screens or special glasses. In this method, normal aspects of vision are used to transfer the information required into the central nervous system through the eyes.

Human eyes do not have equal resolution over their entire retinas. The closer to the center of the visual field (known as the fovea), the higher the acuity—the finer the detail which can be resolved. The human visual system moves the eyes about in jumps in order to gather the information necessary to assemble a perception of reality. These jumps, called "saccades," move the fovea about the scene, producing simultaneous shifts in the visual image over the entire retina.

Since they do not involve the observer moving relative to the scene, saccades do not normally provide any spatial disparity information which would impart three-dimensional perception to the visual system. However, the invention makes use of the saccadic information gathering feature of the visual processing system to also impart data the central nervous system interprets as three dimensional.

The simultaneous, synchronous image motion over the entire retina during saccades produces bursts or waves of activity in the visual system. By producing small image changes at a saccade-like rate, the invention imparts three dimensional perception in a natural manner. In spite of the fact that the image changes may actually portray a deforming spatial structure, since the visual processing system assumes a rigid structure will be seen (as it has been trained to do by common experience), a rigid structure is perceived.

Of significant theoretical interest is the fact that the invention demonstrates the theoretical contention that bursts of activity do not have to originate with the observer in order to be processed as saccadic by the visual system. As long as the image transformations are small (i.e. within the range called $d_{max}$, discussed below) a stable perception will result. Saccades occur in random temporal and spatial distributions; these distributions are simulated in this process.

The process of carrying out the invention displays a three dimensional view on a two dimensional surface to enable human perception of three dimensions. It includes providing a database of information on the view to be displayed in which features of the view are recorded with position parameters in three dimensions. The view is displayed on a two dimensional surface with points on the surface making up the displayed view determined as a direction of sight rendering of the view derived from the position parameters recorded in the database. The view is modified in accordance with variations in the direction of sight such that motion parallaxes are displayed perceptibly to the human eye. The human facility of spatial perception interprets the motion parallaxes as a three dimensional rendering of the view.

The method may also be described as displaying a three dimensional view made up of features on a two dimensional surface to enable human perception of the three-dimensionality of the features. As such it includes rendering an image of the view on the surface. It also includes creating a display of a perceptible three-dimensional coordinate display space in which the displayed view is rendered by modifying the view as rendered to create motion parallax, whereby the human facility of spatial perception may interpret the motion parallax to produce the perception of three-dimensionality.

The method includes rendering the image as a view of any suitable database such as a computer-aided-design database, a scientific visualization database, a molecular modelling database, a medical imaging database, a computer-aided-tomography scan, a nuclear magnetic resonance database, a dimensionalized relationship of variables, a database useful for air traffic control, a database useful for military situation displays, a videogame, or video data. The method may include generating a view of a data encoded in a RAM, ROM, PROM or EPROM.

Described mathematically, the method involves mapping data through mathematical transformations which provide rotations, translations or scaling. The motion parallax may be obtained by small non-cumulative microshears of features of the view or by small, non-cumulative microrotations of features of the view.

The method may include compiling a database from data having three dimensional information about features of the view derived from analysis of differences between multiple optically-obtained depictions of a scene to be displayed. The multiple depictions may be obtained from multiple aperture locations of video camera means or from multiple aperture locations of motion picture camera means.

In a preferred embodiment the database includes x, y and z dimensions and the x and y dimensions are used to define the plane of the surface on which the view is displayed. A static offset shift is applied to the view whereby features are shifted in position in a direction parallel to the x-y plane, with the amount of shift being directly proportional to the z component of the feature displayed.

Desirably, the method includes applying a monocular depth cue to the view. The depth cue may include perspective in which features further from the viewer along the direction of sight of the view are reduced in size to a greater extent than features closer to the viewer. Another desirable depth cue for some displays is variable intensity such that features of the view further from the viewer along the direction of sight are displayed with less intensity than features closer to the viewer. Another depth cue is variable contrast such that features further from the viewer along the direction of sight are displayed with less contrast to their environs than features closer to the viewer.

For some displays a three dimensional grid or other regular array of features is included with the view to be displayed to provide a frame of reference to enhance the viewer's perception of the three dimensions in which the view is situated.

Fuller appreciation of the perception of space from the motion parallax is obtained by modifying the displayed view repeatedly. The modifications are preferably at intervals similar to the intervals between eye saccades (which are not regular).

The method is preferably carried out with a database including x, y and z dimensions (or some other Cartesian-consistent nomenclature). The x and y dimensions are used to define the plane of the surface on which the view is displayed and the z dimension is at least approximately along a direction of sight through the surface. A plane substantially parallel to the surface is considered as a neutral plane. The perceived direction of sight is periodically shifted through a point on the neutral plane, so that points on the displayed view representing features closer to the viewer along the z dimension than the neutral plane are shifted in one direction and points further than the neutral plane are shifted in the opposite direction and all such points on the surface are shifted substantially simultaneously. The shifts of the points on the surface take place in an amount less than the amount which would result in solid features of the view appearing to break up. The shifts of points representing a feature are of magnitude determined by the magnitude of the angle of the change in direction of sight and the distance of the plane of the feature from the neutral plane. In one embodiment the view is displayed as situated in a space and the motion parallax is produced by small, non-cumulative shears of the space. Preferably, the direction of sight varies at intervals similar to the intervals between human eye saccades.

The shifts of the points on the surface take place in directions having both x and y non-zero components. Preferably, the shifts are between points arrayed in a closed path on the surface so that after a complete traversal of the path by a sequence of shifts the points have no net displacement. Desirably, the shifts take place after a period correlated with the magnitude of the last shift and the shifts from one point on the path to another are in a sequence such that the viewer's visual system cannot predict the sequence. In preferred embodiments there are at least three points are on the path.

The present invention also provides an apparatus for displaying a three dimensional view on a two dimensional surface to enable human perception of three dimensions including a database storage medium storing a database of information on the view to be displayed in which features of the view are recorded with position parameters in three dimensions, a two dimensional surface, a display device for displaying on the surface points making up the view determined as a direction of sight rendering of the view derived from the position parameters recorded in the database, apparatus operatively interposed between the database and the surface to modify the displayed view in accordance with variations in the direction of sight such that motion parallaxes are displayed perceptibly to the human eye, whereby the human facility of spatial perception may interpret the motion parallaxes as a three dimensional rendering of the view.

The apparatus may also be regarded as displaying a three dimensional view made up of features including a two dimensional surface and means for rendering the view thereon and means for creating a display on the surface of a perceptible three-dimensional coordinate display space in which the displayed view is rendered, including means which modifies the view as rendered to create motion parallax, whereby the human facility of spatial perception may interpret the motion parallax to produce the perception of three-dimensionality.

The means for rendering includes any suitable database such as a computer-aided-design database, a scientific visualization database, a molecular modelling database, a medical imaging database, a computer-aided-tomography scan, a nuclear magnetic resonance database, a dimensionalized relationship of variables, a database useful for air traffic control, a database useful for military situation displays, a videogame, or video data. The database of data on the view may be encoded in a RAM, ROM, PROM or EPROM. The means for modifying maps data through mathematical transformations which provide rotations, translations or scaling.

The apparatus may include means for compiling a database from data having three dimensional information about features of the view derived from analysis of differences between multiple optically-obtained depictions of a scene to be displayed. The means for obtaining the multiple depictions from multiple aperture locations may be video camera means or motion picture camera means.

The means for compiling includes means for obtaining the motion parallax by small non-cumulative microshears of features of the view. In an alternative embodiment the means for compiling includes means for obtaining the motion parallax by small, non-cumulative micro-rotations of features of the view.

Desirably, the apparatus further includes means for applying an offset shift to the view whereby features are shifted in position in a direction substantially perpendicular to the direction of sight, with the amount of shift being proportional to the distance from a frontmost plane of the view to be displayed. The direction of the offset shift preferably includes horizontal and vertical components greater than zero.

With the database of data about the view including x, y and z dimensions or other Cartesian-consistent nomenclature and the x and y dimensions being used to define the plane of the surface on which the view is displayed, the means for creating a display may include means for applying a static offset shift to the view whereby features are shifted in position in a direction parallel to the x-y plane, with the amount of shift being directly proportional to the z component of the feature displayed.

If desired the apparatus may include means for applying a monocular depth cue to the view. The depth cue may include perspective in which features further from the viewer along the direction of sight are reduced in size to a greater extent than features closer to the viewer. Another possible depth cue is variable intensity such that features of the view further from the viewer along the direction of sight are displayed with less intensity than features closer to the viewer. A third depth cue is variable contrast such that features further from the viewer along the direction of sight are displayed with less contrast to their environs than features closer to the viewer. The apparatus may include means for displaying a three dimensional grid or other regular array of features to provide a frame of reference to enhance the viewer's perception of the three dimensions in which the view is situated.

The apparatus usually includes means which modifies the displayed view repeatedly. It modifies the view repeatedly at intervals similar to the intervals between eye saccades. A particularly significant feature of saccadic shifts is their randomness or perceived randomness, both in time and direction. It is very desirable to simulate such randomness or at least enough complexity that the visual system cannot predict the modifications.

In a preferred embodiment, the apparatus for creating a display has x, y and z dimensions with the x and y dimensions defining the plane of the two dimensional surface on which the view is displayed and the z dimension is at least approximately along a direction of sight through the surface. A plane substantially parallel to the surface is considered as a neutral plane, and the means for modifying the view shifts the perceived direction of sight of the view through a point on the neutral plane. Thus, points on the displayed view representing features closer to the viewer along the z dimension than the neutral plane are shifted in one direction and points further than the neutral plane are shifted in the opposite direction. The shifts of points are of magnitude determined by the magnitude of the angle of the change in direction of sight and the distance of the plane of the feature from the neutral plane. However, the apparatus is configured so that the shifts of the points on the surface take place in an amount less than the amount which would result in solid features of the view appearing to break up. The direction of sight varies at intervals similar to the intervals between human eye saccades.

The shifts desirably take place in directions having both x and y non-zero components. The shifts are between points arrayed in a closed path on the surface so that after a complete traversal of the path by a sequence of shifts the points have no net displacement. Desirably, the apparatus causes the shifts to take place after a period correlated with the magnitude of the last shift. The shifts from one point on the path to another are in a sequence such that the viewer's visual system cannot predict the sequence. It has been found that this is assisted by there being at least three points on the path.

The apparatus may include a first database storage medium storing data about the view to be displayed; a second database storage medium downstream of the first database storage medium, a graphics processor and a CRT driver downstream of the second database storage medium. The means for modifying the view includes a computing device interposed between the first and second database storage media to modify the data stored in the first medium and apply the modified data to the second medium and a plurality of image buffers downstream of the graphics processor to store modified versions of the view, from whence the modified versions of the view are selectively and periodically displayed by the CRT driver.

In another embodiment the apparatus includes a first database storage medium storing data about the view to be displayed, a plurality of subsequent database storage media downstream of the first database storage medium, a plurality of graphics processors, one associated with each the subsequent storage media and a plurality of image buffers, one associated with each of the graphics processors and a single CRT driver downstream of the image buffers. The means for modifying the view includes a plurality of computing devices interposed between the first and subsequent database storage media, one associated with each subsequent database storage medium, to modify the data stored in the first medium and apply the modified data to its associated subsequent medium, the associated downstream graphics processor and image buffer. It also includes a control means to selectively and sequentially apply the contents of the image buffers to the CRT driver for display of the view in a fashion to create motion parallax. If the display surface is a raster scanned CRT, the means for creating the display desirably includes means for sub-pixel addressing and center of brightness plotting to minimize "jaggies."

In addition, the first database storage medium could have the transformation stored therein, if the source of the database includes means for making such transformations.

BRIEF DESCRIPTION OF THE DRAWINGS

The invention will be better understood from a reading of the following detailed description along with a review of the drawings in which:

FIG. 5 is a conceptual view of the various positions of the shifts along a frontmost plane and their associated lengths, positioned on points on a circle of radius A;

FIG. 6 is graph of the decay of the parallax drive as a function of time since a previous shift;

FIG. 7 is a representation of the depiction of a three dimensional grid usefully displayed as a part of the present invention;

FIGS. 8, 9 and 10 are representations of alternate grids with FIGS. 9 and 10 including data depicted therein, illustrating the interaction of the perception of the grid and the data;

DETAILED DESCRIPTION OF PREFERRED EMBODIMENTS

Psycho-Physiological Considerations

Figure 2:
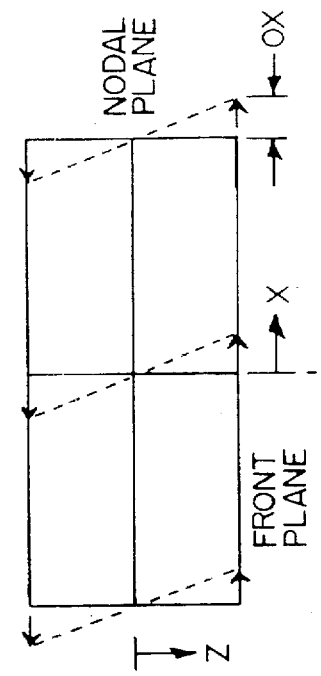
FIG. 2 is schematic top-view depiction of the shifting of the positions of elements in a view with the elements shifting in accordance with shear displacements.

The human (and perhaps lower animal) visual system can generate the perception of space from parallax arising from the observed view. Parallax is a measure of difference: the difference between the images to the two eyes, known as stereoscopic parallax, or differences in motion between components in the image perceived on the retina, known as motion parallax.

Stereoscopic parallax differences arise from the different locations of the two eyes; their different locations in the head cause them to see different images, despite the fact that they are looking at the same object or scene. As an illustration, consider two photographic slides made of a structure or scene from two adjacent positions, shifting the camera laterally between taking the pictures. If the two slides are then projected onto a screen to make them overlap, it will be found that a perfect match cannot be achieved over the whole image as projected. Perfect registration can be made only with objects or features which are at a common distance from the two locations where the camera was situated when the exposures were made. The same happens to the two images seen by the two eyes. The mismatch between any equivalent points in the two images is the parallax.

In stereoscopic vision, the parallax differences are called "disparity." The disparity between the features in the two images in the eyes is directly related to depth and spatial structure. Where the disparities between the two images are small, the result is not double images but a single fused image. This property of fused stereoscopic images is termed "stereofusion." The angular separation or difference between the two images which still remain fused is termed "Panum's area of fusion" and is roughly 7'. The actual amount of angular disparity which will remain fused is a function of viewing conditions, disparity gradients, image spatial frequencies and so forth. The stereoscopic parallax described above results from the disparities between the images on the retinas of the two eyes.

The visual system can use motion parallax. In watching a moving object (or watching a stationary object while the viewer moves), the viewer moves his/her eye while fixating his/her gaze on the object. The retinal image of the fixation point or object will not move or will move relatively little. The retinal images of features in front of and behind the plane of the object will move in opposite directions.

Apparent motion is produced when stationary images of moving objects are flashed in sequence. Motion pictures make use of this phenomenon. Motion parallax can be reduced to a series of images which differ in viewing position. Each image is a "snapshot" of the scene; sequential images differ according to the spatial structure of the scene.

In summary, two types of parallax are traditionally defined, stereoscopic parallax and motion parallax. Stereoscopic parallax, also known as binocular parallax, is the difference (spatial derivative) between the images on the two retinae. Motion parallax is the relative motion (temporal derivative) of elements within the image on either and/or both retinae. The visual system appears not to use the absolute parallax for the perception of spatial structure from motion parallax. Instead, local relative parallax is used. The term "local" is used to indicate elements of the retinal image(s) which are close to each other. Local parallax is the relative parallax between nearby features in the retinal image. It has been found that the visual system can generate the perception of spatial structure from the local parallaxes, apparently using an equivalent to differential geometry. The entire spatial structure is perceived as an integration over the image of the local structural relationships. For motion parallax, even if an entire region of the retinal image is moving, it is the relative motions in the locale of the retinal image which are used to create local structural information. The manner in which the local areas are connected and the integration of structure over those connections produces the entire structural perception. The sizes and distances (scale) of the structure are estimated independently. The independence of structural perception and structural scale is true for both stereoscopic and motion parallax.

The perceptibility of spatial structure appears to be a bimodal (dichotomous) process with no gradual transition between the presence and absence of the perception of spatial structure. That is, the visual system either recognizes three dimensionality or it doesn't; there is no middle ground. If the disparities giving rise to a perception of space are suddenly removed, there will be a persistence of spatial perception for up to a second. The greater the disparity within fusional limits, the longer the persistence.

The eye helps the visual system assemble information about a view by moving over the view periodically in a process called saccades. Normally, saccades provide no motion disparity. However, the process of the present invention produces a sequence of small shifts of image structure which occur in a pseudo-random manner to mimic the saccades in periodicity and which result in disparities that the visual system interprets as three dimensions. These shifts produce high instantaneous rates of change in relative displacements, but since they stop immediately, there is little net change. These can be thought of as rotations without displacement in the line of sight of the view toward the object viewed. A computer- or graphics-controller produced display process can create equivalent shifts in the view being displayed on a two dimensional screen.

There are at least two methods for obtaining suitable shifts. In one, called the shearing method, the space being displayed is divided into a plurality of planes generally parallel to the screen. One of the planes is selected as a neutral or nodal plane. Data points in each of the other planes are shifted relative to data points in other such planes by an amount dependent on the distance between such plane and the neutral plane and also dependent upon the magnitude and direction of a shift operator, selected in at least a pseudo-random fashion, as described more fully hereinafter. The effect can be analogized to a stack of transparent sheets, all drilled through with aligned holes with a rod passing through the aligned holes. One of the sheets is held in position (the neutral plane) and the rod is moved in a pseudo-random fashion as the shift operator, pivoting about the pivot point in the neutral plane sheet. As can be appreciated, sheets forward of the neutral plane will move in one direction, by an amount proportional to their distance from the neutral plane, and sheets rearward of the neutral plane will move the other direction, again by an amount proportional to their distance from the neutral plane. Each shift by the rod makes corresponding shifts of this nature by the sheets, regardless of the direction of the rod's movement. Points on the sheets will, of course, be given the same types of movements as their entire sheets. The sheets move laterally, like a shear motion, and the individual points move with them. If the points are opaque, the sheets are transparent, and the movements of the rod are pseudo-random at a suitable rate, the points are seen by an observer to be located in a space having three dimensions. The points' positions relative to one another are seen to change in a fashion sufficiently similar to the way actual points in space change due to motion disparity, that the visual system perceives space.

Actually, it is necessary only to move the points, not the whole sheets, since the transparent sheets add nothing to the viewed display. For the purposes of reducing mathematical complexity, such movements of only the points, not the sheets as a whole, will be preferred. Each such localized movement of a point is called a microshear, and the sum of the microshears over the viewed space provides the perception of three dimensional space. One feature of the microshears is the possibility of moving points into and out of occlusion. Occlusion occurs when an item in the foreground obscures the viewer's vision of an item in the background.

In actuality, motion parallax disparities occur because the points move not only in planes perpendicular to the line of sight from the viewer, but also into and out of the planes front and back of them. Motion parallax produces a perception of rotation of the point on a sphere centered at the visual fixation point of the viewer. This motion is slightly different than the motion simulated by movement only in the plane of the data point, and is termed "micro-rotations," also part of this invention. However, the planar method is easier to implement, so it is preferred.

The error the shear method introduces constitutes a slight distortion in the shapes of rigid objects and the distances between points. However, the visual system does not seem to notice the difference, as long as the shears are sufficiently small. This is accounted for by two facts: the tendency of the visual system to assume that viewed items are rigid, a tendency reinforced by daily experience, and by the fact that the variation from real motion parallax consists of omission of a display of movement parallel to the line of sight, a display which is difficult to notice and does not significantly contribute to the perception of three dimensions.

Again with reference to the shearing method, the effect is achieved by having a computer-controlled system create locally consistent but globally incorrect displacements which are related to the spatial structure to be viewed. This is done through a sequence of small lateral shears of the structure imaged and the space in which it is displayed. These shears are normal to the line of sight. One feature of this shear technique is that there is no net rotation of the displayed space, i.e. the lateral shears are not accompanied by motions normal to the surface of the display surface (e.g., CRT screen), which would occur in full rotations. This produces a display which is more pleasing to observe.

A significant feature of the invention is the fact that the shears are not solely horizontal. In fact horizontal (i.e. left to right or right to left) shears are only one of a great many directions in which the shears may occur. Vertical shears and diagonal shears of various slopes are used to good effect. In particular, the inclusion of a multiplicity of directions of shears assists in avoiding the problem of anticipation of shears by the visual system, which can be noticeable and distracting.

Mathematical Considerations

Parallax can be considered mathematically; it has both magnitude and direction, hence, it is a vector. Image features which coincide exactly have zero parallax vectors; all points in space closer than that distance will have parallaxes which point in one direction. Points which lie at greater distances will have parallax vectors which point in the opposite direction. The location in space of each point relative to the plane of registration is related to the amplitude and direction of a vector. The greater the distance from the plane of registration, the larger the vector.

Each point's parallax can be mapped into a two-dimensional plane as a specific vector. A map of all of the parallax vectors for the entire image pair is a vector manifold.

This map, or manifold, of vectors is a map of spatial structure. It is essentially an unscaled manifold; the spatial structure is defined without any metric. The scale, or metric, is determined by other factors, typically called "monocular cues." These include familiar size, brightness, texture gradients, perspective and so forth.

A system with an 8-bit depth (i.e. 256 layers) is a convenient example. The actual number of resolvable layers is a function of the magnitude of the shift radius (A) for the front layer. Given the 256 layers, we can define positive (+z) levels of 1 to +127 and negative z's of −1 to −128 (z is normal to the screen surface). The neutral or nodal plane is zero. The shift radius (A) is applied to z as:

$$A_z = Z(A)/128$$

in which $Z(A)$ is the maximum shift radius at the front or rear of the volume. The sign of z determines the direction of $A_z$; the top (+z's) planes move in the opposite direction of the bottom (−z's) planes. All shifts are on or within a circle of radius $A_z$.

Much of the mathematics possible can be performed in integer math, as it is faster and, in the final system, will constitute a more reasonable system architecture. In one embodiment, the units may be in terms of vector points. This is essentially a 10 bit×10 bit display area (1020×1020). An estimate of radius A can be made from Panum's area of fusion (7'). Three screen resolution units are used in practice to achieve adequate depth resolution.

Database Considerations

Various types of data are known to be desirably displayed for viewing. Often data is stored or otherwise available in a database giving coordinates of the datapoints in space. That is, the data will be associated with x, y, and z coordinates in the database, so that the display of the data on a two dimensional screen having x and y coordinates can be depicted using the z coordinate data in any of various ways to suggest three dimensionality. The rendering of a view of the data is accomplished by associating the data points with corresponding points on a video or other display and displaying them on a cathode ray tube or a projection screen at the position in the x-y plane of the screen corresponding to their x-y values, modified as desired by the z coordinate. These modifications have included perspective, shading, static offsets, and the like, but have not included random (in time or direction) dynamic modification of the rendered view to impart information which the visual system interprets as space, especially using motion parallax.

The types of views to be displayed are various. Typical displays include a. databases generated by CAD software, b. scientific visualization databases, generated to assist scientists in visualizing abstract, microscopic or other not-normally viewable scenes, c. molecular modeling databases, similar to scientific visualization, applied specifically to the display and viewing of molecular structures;

d. a medical imaging database, in which data derived from patients is compiled into a visual display to assist in diagnosis or treatment;

e. a computer-aided-tomography scan database, similar to medical imaging databases, using CAT technology;

f. a nuclear magnetic resonance database in which the data to be displayed is derived from NMR;

g. a dimensionalized relationship of variables, in which data points which may or may not relate to any real physical item but which are mathematically related to one another are to be depicted graphically;

h. a database useful in air traffic control, such as a display of an airspace around an airport, to permit air traffic controllers to view representations of aircraft to assist in scheduling and collision avoidance;

i. a database useful for military situation displays, similar to the displays used by air traffic controllers, but depicting military forces and, perhaps, their capabilities;

j. a videogame; and k. video data, such as obtained from video or motion picture cameras or charge couple devices.

The database to be displayed is stored in a medium useful for outputting to the display device selected. Thus, when the display device is a cathode ray tube, the storage medium can be any suitable medium, such as random access memory (RAM), read only memory (ROM), programmable read only memory (PROM), or erasable, programmable read only memory (EPROM), as only a few examples. The database may also be arrayed on film, such as motion picture film, with the projected image from the film having the three dimensional space aspects of the present invention. In order to accomplish this, the three dimensional space aspects should be applied to the image recorded on the film.

One way to make a film recording of this type is to use two cameras which each record a scene from a slightly different angle. The optically-obtained images recorded by the cameras are digitized and the two digitized images are compared electronically to derive differences in the images attributable to the depth of the items imaged. These differences are then used as the basis for applying the shears or rotations described more fully hereinafter. This is easier to do if the cameras are video cameras, the images from which are more easily digitized than motion picture film images. Nonetheless, the composite images may be recorded on motion picture film for projection. Alternatively, the image can be stored electronically for display in a cathode ray tube.

Geometrical Considerations

The computer generated three-dimensional display process performs geometrical manipulations of the structure and space to be displayed. This can be enhanced to produce the best results with reduced computational complexity by using the concept of the decoupling of geometrical axes. This also produces simplifying geometrical conventions.

Geometrically, for a rigid body moving in normal (i.e., Euclidean) space the three Cartesian coordinates of x, y and z are said to be rotationally coupled. To illustrate this, consider a point rotating in a circular path in space. The point, p1, rotating in an x-y plane about a fixed center, p, at a constant radius, r, moves simultaneously in the plane of x and y. The radius, r, and the angle the radius makes with the x-axis, $\Theta$, determine the relative changes in x and z. That is, as the point rotates, its x and y coordinates are x = r sin ($\Theta$)

y = r cos ($\Theta$)

Thus, we can say that the x and y dimensions are rotationally coupled.

This description of the rotational coupling of Cartesian axes by the motion of a rigid object can be expanded to all three axes; a system with three translational dimensions and three (rotational) coupling factors results. Consider two points on a rigid object which is free to move in space. The movements of the points are bound by their rigid connection. As a consequence, the motions relative to each other can be described solely in terms of rotations, as the distance between the points cannot change. The centers of rotation need not be within the bounds of the rigid structure. Angular motions produce perceived motions of the points relative to each other irrespective of the center of rotation. As the rigid connections between the points serve to define the relative motions of the points, so these relative motions (via rotations) also serve to define the rigid structure. Changes in x are coupled to changes in y by rotations about an axis parallel to the z axis. Similarly x and z changes are coupled via y rotations, and y and z by x axis rotations.

Figure 4:
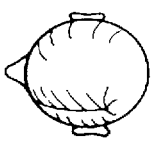
FIG. 4 is a conceptual view looking in the direction of the y-axis of the shearing of values of x at various points along the z-axis.
Figure 4:
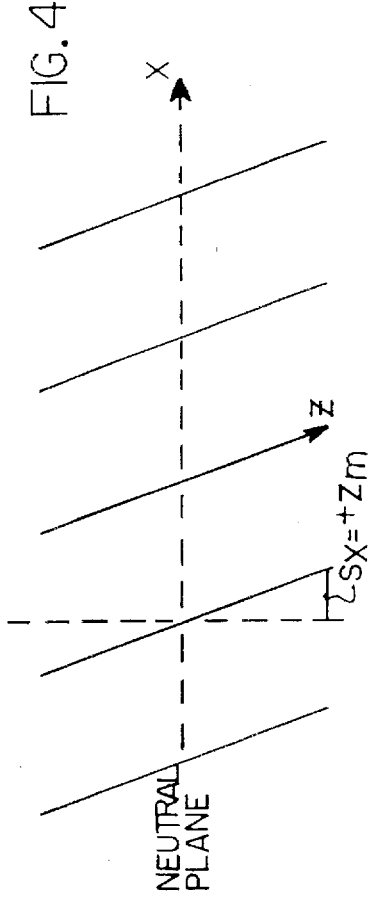
Figure 1:
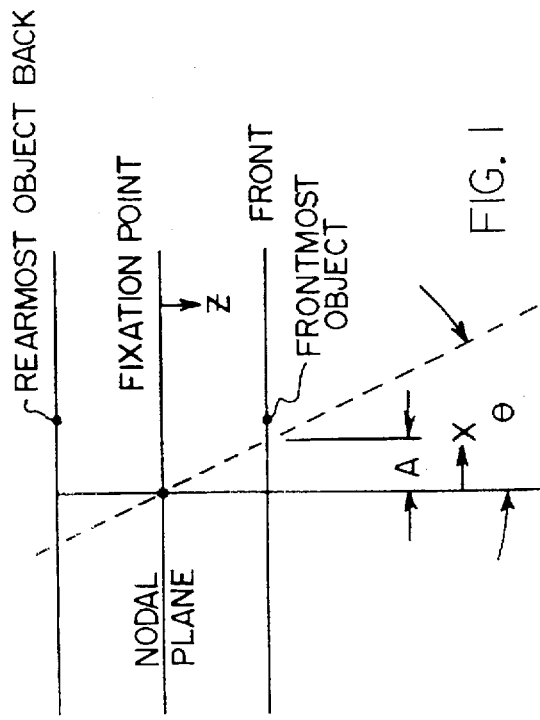
FIG. 1 is a schematic top-view depiction of the relative lines of sight of a viewer, depending on the viewer's position.
Figure 3:
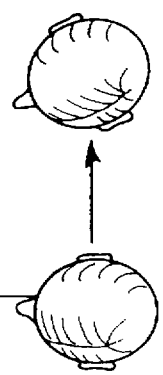
FIG. 3 is schematic depiction of the shifting of the x and y positions of an element at a selected z value.
Figure 3:
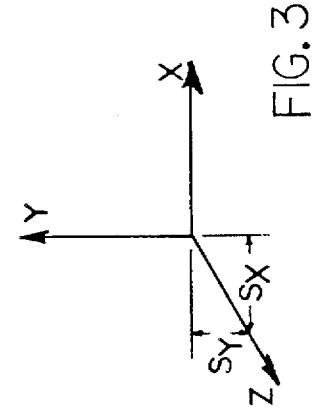

In the shearing process of the present invention the dimension normal to the screen, z, is decoupled from the x and y dimensions. There are no changes in the z dimension with shear changes in x and y. As a consequence, there is no net rotation, even though the local differentials along the dimension indicate it. The three Cartesian coordinates are shown in FIG. 3 as positive vectors. The x and y axes form a plane which is defined as the neutral plane; it is perceptually located at the surface of the display screen, hereafter called the "screen." The neutral plane can also be provided as a plane rearward or forward of the screen. Associated with the z axis are defined two shears, Sx is the shear along the z axis in the x direction (shown from the top in FIG. 4). Similarly, Sy is the shear along the z axis in the y direction. Although not required, for simplicity, the origin (x=0, y=0, z=0) is placed in the center of the volume defined by the coordinates x, y, and z. Of particular interest is the depth value, z. With z=0 at the center of the volume, the display occupies a volume from +Zm to −Zm. The z shears, or as they will be referred to herein, the shears, have maximum displacements at the front and back of the display volume.

In one preferred embodiment, eight possible shear locations are used. These locations may be evenly spaced on the perimeter of a circle of radius A, as shown in FIG. 5. Any number can be used, they do not need to be evenly spaced, and they do not have to be confined to the perimeter of a circle, although this produces a good effect. An embodiment with four (4) shifts has also been used with good effect; this smaller number at 90° intervals is more readily implemented in computer/workstation systems with small memories and low speeds. Each shear, $A_{pz}$, in the volume can be considered in terms of the shift of the frontmost z layer, with the other shears a function of z:

$A_{pz} = (z/z_m) A_p$.

$A_p$ denotes the maximum displacement vector (having both magnitude and direction) in the frontmost plane for a particular shift from one shift position to another. In the case of eight shift positions, p=1, 2, . . . , 8, shown in FIG. 5 these will specify x and y displacements from the center of the circle on the frontmost z plane. This vector length will be reduced by multiplying $A_p$ times the ratio of z for a particular depth with $Z_m$. This ratio applies to all points on that plane. $A_{pz}$ is made up of two components, $A_{xz}$ and $A_{yz}$, which are the x-direction and y-direction vector components of $A_{pz}$, respectively.

The magnitude of any shift should be large enough to be perceptible, yet not so large as to cause loss of stereofusion. It has been found that A should approximate one half of Panum's area of fusion, 7'. Typically, the screen width can be considered a 30° field of view. Panum's area relates to stereo disparity; for small shifts the equivalent term is "$d_{max}$":

A ($d_{max}$/30×60)×(100/2)=0.2 percent of display width

In practice, this value can vary by a factor of 2 and continue to function quite acceptably; it is affected by the display contents and resolution. The apparatus use to implement the invention may be equipped to vary A as desired for viewing from various distances. The maximum shift radius A is small, typically from 0.1 to 0.4 percent (%) of the screen width.

It is readily apparent that for an eight-position, equally spaced pattern as shown in FIG. 5, from any one position there are seven positions that can next occur. These will have one of four different lengths: 1 (the smallest), 1.84, 2.41, and 2.61. The three smaller lengths can be either right or left hand; there is only one position 180° away.

During normal vision, the eyes move in jumps (saccades) or in smooth pursuit tracking. The saccades serve to provide a synchronizing activity over the retina and within the visual system. The visual system is sensitive to the coherence of activity over the retinal image. In the present invention shifts between viewing angles are used; this produces the largest instantaneous derivative with the smallest net displacement. If only two horizontal shift positions are used in alternation, the oscillation can be perceived and appears to build. In the present invention the shift positions are not restricted to the horizontal plane. If the display is generated as a sequence of images representing incremental shifts around the circle in even increments of time, the initial perception is one of spatial structure. After a few seconds, the visual tracking system starts exhibiting predictive behavior, attempting to track the apparent motion in smooth pursuit. Smooth pursuit produces an error due to the small actual shift. The error correction in smooth pursuit tracking thus produces an exaggeration of the actual motion. This tendency exists even if the viewer attempts to suppress this tracking. The central nervous system typically functions to reduce the stimuli into components, and a regular display mode has highly predictable components which can be extracted and perceived separately.

Accordingly, in the present invention, it is desired to introduce randomness to the shifts as applied. This removes predictability while maintaining all displacements within a $d_{max}$ range such that the image components will be close enough together to produce a fused image. The use of several (more than 2) shift positions, and those not being all in a straight line, permit the shifts to be randomized.

If image features which are close to each other in the retinal image both shift in the same direction, but one more than the other, it is the relative displacement (i.e., the local differential displacement) between the features which determines local structure. As will be discussed below, the manner in which the entire display image is linked or interconnected determines the perceived global structure. The shift can be envisioned as producing an instantaneous motion parallax-induced depth derivative $D_0$, which drives spatial perception. This drive can be modelled as an exponentially decaying parallax drive level in the visual system as seen in FIG. 6:

$$D=D_0 e^{-(t/T)}$$

As long as this exponentially decaying drive, D, is above some critical structural perception threshold, $D_m$, a spatial structure will be perceived. The values of $D_m$ and T are experimentally determined. t is the time following the most recent shift. It is readily apparent that the larger the shift, the longer the perception of spatial structure will persist. For the sake of simplicity, a model in which $D=D_m$ after one time period (i.e., T) for the smallest shift was used. A shift larger than the smallest shift will produce a parallax drive which takes longer to decay down to the threshold level. Although it is the local relative shift in the image components which actually defines the parallax drive, a simplifying assumption is made that the largest local parallax is equal to the parallax between the front- and rear-most spatial planes; specific applications may use different criteria.

The shift schedule is constructed to roughly model the distribution of saccades during normal eye movement; a pseudo-Poisson distribution may be used. A balanced pool of an equal number of + and − shifts was created such that any sequence generated from that pool would have a net shift of zero, allowing it to be used over and over again. The sequence was developed by randomly drawing from the pool without replacement, a common statistical technique. It is necessary that the total sequence length be greater than 5 or 6 seconds so that the repetition will not be obvious. Table 1 is a summary of the shift lengths, and sequence requirements for an eight position shift sequence. Equivalent tables can be readily made for other numbers of shifts.

| Shift Between Position Numbers (Exemplary) | Number of Shift Positions | Relative Shift Lengths | Relative Frequency of Occurrence | Relative Duration |
| --- | --- | --- | --- | --- |
| 1 and 2 | 1 | 1.000 | 7 | 1.000 |
| 2 and 4 | 2 | 1.848 | 10 | 1.614 |
| 4 and 7 | 3 | 2.414 | 9 | 1.881 |
| 7 and 3 | 4 | 2.613 | 6 | 1.960 |

The base time for the shift sequence is normalized to the shortest shift (i.e. 1.000 above), and hence the shortest time. Base times of from 60 ms to 300 ms work well. The optimal time can be rationally determined, and is determined by the specifics of the application; it will be discussed below.

A finite number of effective shift positions are used, as shown in FIG. 5. This number can be varied. All positions are an equal distance from some hypothetical center, lying in a ring of radius A around it. The small (4–12) number of positions and symmetry result in computationally simple transformations for production of each view.

Monocular Cues

Although this shift process can produce the perception of space, it is also subject to ambiguities: if the z axis were projected directly out of the screen surface, a line parallel to the z axis could appear to have no change for an 180° shift, and could appear to simply rotate in an x-y plane. To produce a better display, the entire display volume can be subjected to a fixed, front-to-back x-y shift, called an offset shift, O, composed of $O_x$ in the x direction and $O_y$ in the y. Typically these are not equal and are greater than the maximum shift produced by the above-described process. Preferably, the amount of offset shift for both directions, x and y, is greater than 0. Different scenes benefit from different fixed offset shifts. In a manner analogous to the parallax-simulating shifts, the offset shifts can be related to a maximum offset in the frontmost z plane, $z_m$:

$$O_z = (z/z_m)O.$$

Although not necessary, some display contents also benefit from a small amount of perspective, typically equivalent to a distance from the viewed space of approximately 4 meters. This perspective adjustment, V, can be generated as a function of x, y coordinates, a depth, z, and constant (C):

$$V_z = -\left(\frac{z}{z_m}\right)VC,$$

$$V_{xz} = -\left(\frac{z}{z_m}\right)V_x(x),$$

$$V_{yz} = -\left(\frac{z}{z_m}\right)V_y(y),$$

The total shear adjustment, S, of each point in the display has three principal components for each position in the depth; two constant terms, offset (O) and perspective (V), and a variable term (A) which varies with the shifting process:

$$S_z = O_z + V_{zc} + A_{pz}.$$

S is of course a vector with x and y components. This is a simple vector summation of terms; the perspective term does not need to adjust either the offset or shift terms. Computationally, this permits the generation of a few lookup tables to simplify much of the mathematics, permitting rapid generation of the display points needed to effectuate the shifts. In the current embodiment, the mathematics are done in integer mathematics. This is of significant commercial value, as it facilitates operation on lower power computers and workstations. It further facilitates the reduction of the electronics required to a small number of binary integrated circuits.

Another monocular cue is the inclusion of attributes of the displayed image. One of the most important is the manner in which the displayed elements are interconnected to produce a structural unity. Gestalt psychologists (e.g., James Gibson) developed the concept of figure and ground when visually isolating components of an image. An analogy can be made in spatial perception. It is convenient to envision a spatial "sky" or other background in which "figures" are placed. A particularly useful application of this relates to displays for air traffic controllers, ATC displays. The empty space in which data points representing airplanes or other craft are displayed can be structured by embedding elements into it. If these elements are features of a structure, the space is perceived to be structured. The presence of these elements and the interrelationship between them give the space complexity and help to form the perception of a structured space.

Such a structure is depicted in FIG. 7. A 2×3 celled structure is shown; the specifics of the number and horizontal-to-vertical ratio of cells may be varied to match the size and aspect ratio of the display device. This structure is constructed of dots, dashes, and lines. Dots and dashes are used to define the structure, because they have well-defined local features which will reveal shifts in any direction. The dots are arranged into "towers" from the top to the bottom of the space. These have a similarity in appearance to lighted radio towers seen from the air at night. These towers are either isolated or embedded into a frame and inner matrix composed of dashes. This boxed structure may be surrounded by a solid line border at the neutral plane. In the example shown in the drawing, the top or front frame is offset from the back or bottom frame by $20_x$ and $20_y$.

The structure produces a well-connected space into which isolated items such as aircraft can be placed. The substructures are arranged in a hierarchy such that an embedded symbol can be perceived as relating to the local features. These features are, in turn perceived as relating to the local structure which then relates to the entire structure. In this way, isolated symbols can be located in a common space.

As the symbols displayed form structures themselves, the need for the structural components is reduced, to perhaps the structures shown in FIGS. 8 & 9. Some structures, such as wireform molecular models shown in FIG. 10, have great inherent structure and few additional elements need to be imposed in the display. In general, the more complete and/or complex the spatial structure, the more robust the parallax drive, and the less of an imposed structure is needed.

The more robust parallax drive may affect the timing of the shifts. That is, more complete spatial structures can have longer periods of time between shifts without loss of spatial perception. This is particularly useful, because transforming and processing complex spatial structures are likely to require more computation time than simpler structures. It is also possible to have too much structure; if the space is overdetermined, such as a molecule displayed within a framework, the two structures can be perceived as disconnected entities. Each is adequately defined by itself.

Some structures can be ambiguous as to which is front and which is rear. These structures can appear to undergo periodic front-to-back reversals. This is prevented by introducing intensity gradations, with higher contrasts in the frontmost plane. Usually this means that the front plane is brighter. This is called "depth cueing" in the computer graphics industry. Some structures can also benefit from the introduction of small amounts of perspective, as described above. If used at all, only small amounts of perspective are required, typically the equivalent of 4 meters from the perceived structure. Intensity cuing and perspective cues provide relative (ordinal) depth information. Intensity is generally more salient than perspective.

Since these cues to depth can be seen with one eye, as well as two, they are known as monocular cues. Any suitable monocular cues may be included, but the ones listed here have been found to be most useful.

Micro-Rotation Embodiment

The display process has as its basis random shifts in apparent viewpoint to produce motion parallax, and the consequent perception of spatial structure. As outlined thus far, the computer-generated display process produces a series of shifts in the virtual structure of the displayed space. These shifts are made up of shears of planes normal to the line of sight and, in one embodiment are made instead of rotations of the spatial structure. This decouples lateral shears from the motions in depth (i.e. motions toward and away form the observer), which would result from a rotation of the spatial structure. In addition to computational simplicity, this has the advantage of producing no confounding rotations of the space while still producing the perception of depth. In another embodiment, small rotations of the spatial structure are performed to generate the equivalent to a shift in viewpoint while also producing the perception of spatial structure. The process variables of viewpoint angle, timing and shift logic are still applicable. The shift vector, A., need only be a single-valued function of z, it does not need to be constrained to a linear or single axis relationship. Additionally, the nature of the relationship can vary as a function of x-y coordinates to suit the resolution requirements of local structures:

$$A_{xyz}=A_0f(x, y, z).$$

Implementation

Figure 11:
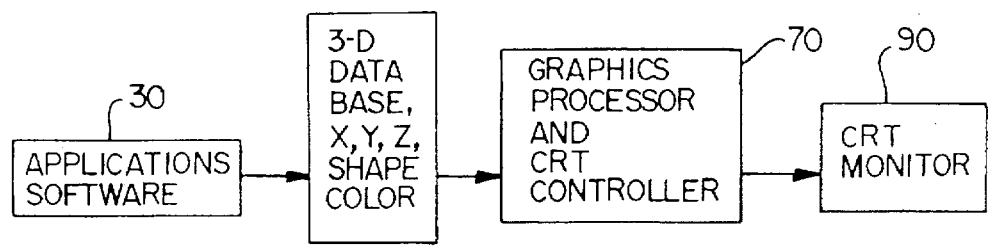
FIG. 11 is a block diagram of a workstation or computer configuration for prior art graphics displays, but which could be modified to operate in accordance with the present invention.

This computer-generated three-dimensional (3-D) display process is not limited to any particular electronic hardware or cathode ray tube (CRT) or other imaging device. In a preferred embodiment, the electronics to perform the shifts and transformations is inserted into an existing display process. A conventional display process is depicted in a block form in FIG. 11. There are known applications software systems 30 such as a molecular modelling or computer-aided design/drafting packages which run on computers. These software programs generate a 3-D databases which have datapoints defined consistent with the screen coordinates, such as in FIG. 3. The graphics processor 70 uses this database to generate an image, filling in surfaces, removing hidden features, and providing shading. The datapoints for this image are mapped into a CRT (or other imaging device) display memory such as random access memory (RAM). The CRT (or other imaging device) controller reads the information out of the display memory to control the activity of the monitor CRT 90 (or other imaging device) to write the image on the screen.

Figure 12:
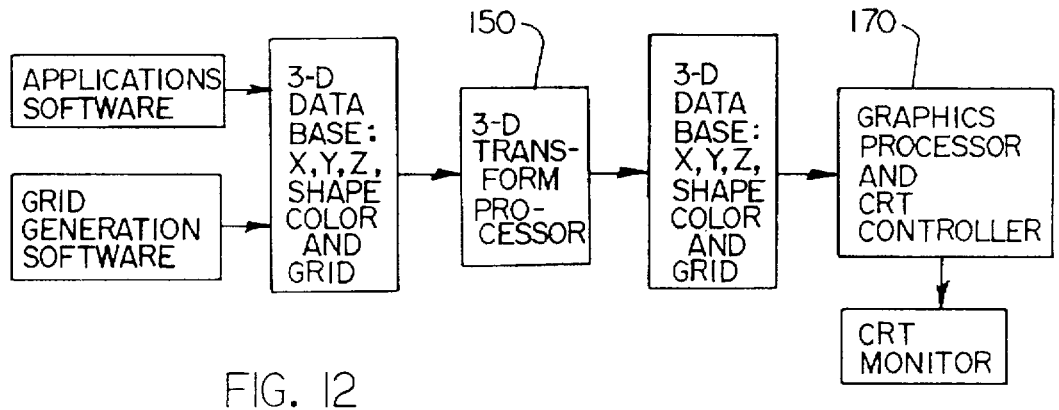
FIGS. 12, 13, 14 and 15 are block diagrams of workstations or computer configurations optimized to incorporate the present invention.

The insertion of the 3-D display transform apparatus 150 into the system, as shown in FIG. 12, converts the original 3-D database into a transformed database. This transformed database is used by the graphics processor and CRT controller 170, as above, to create the displayed images. The display transform apparatus performs a spatio-temporal transform, producing a time sequence of transforms (either sheared or rotated) at random, pseudo-random, or defined periods. Each time the transform apparatus 150 completes a database transformation, the graphics processor 170 cycles through the database, generating the image display data. In addition the transform apparatus 150 adds the desired monocular cues.

The size of the static offsets (Ox and Oy), the number of shift positions (n), the radius (A), and the base time unit (T) can all be changed to suit the particular application. The mathematics of the transform can be performed in fixed-base (as opposed to floating point) format, which can result in considerable increase in processing speed. A fixed number of shifts can be used, although this is not required. The process can use separate addition of the x and y components to generate the local total offset x and y components, which are then added to the database points. The individual values for static offsets, shift amplitudes and directions, and perspective (if used) can be precalculated and arranged in look-up tables as part of the transformation apparatus 150 for rapid access.

Shift timing and selection can have characteristics most comfortable to the viewer for the specific application. For base times (T) in the 60 ms to 300 ms range, a random time characteristic which approximates human saccadic intervals produces acceptable results. This has been modelled as an approximated Poisson distribution, although other characterizations may be applicable. As was noted above, larger shifts create a greater parallax drive, so the next shift after a large shift need not be as early as after a small shift. The converse is also true, so, the distribution of intervals desirably controls the selection of shift amplitudes. Alternatively, the distribution of shift amplitudes determines the distribution of shift intervals.

Figure 13:
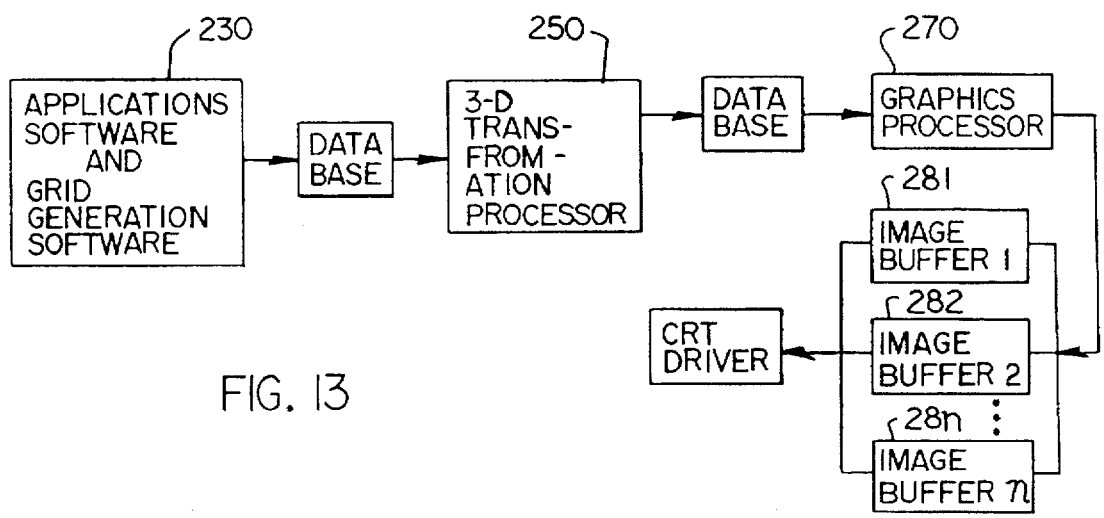

The specifics of any given implementation reflect the architecture of the electronic hardware and the control software and will be readily apparent to those of ordinary skill in the art of digital computers. The applications, 3-D transform, and graphics processor are tied together by control software and hardware. When the database has been transformed, and the time interval has expired, the system controller signals the CRT controller to display the next (shifted) image. The image shifts should occur virtually simultaneously across the display screen (within 20 ms). If the displayed structure is relatively simple and/or is of wireform nature and no hidden line removal is required, the graphics processor may be able to recalculate the entire image in a short enough time period that no extra image memory buffer is required. The transform process can be achieved on complex images and/or with slower processors through the use of multiple memories such as image buffers 281, 282 . . . 28n, as shown schematically in FIG. 13.

All n shift position images can be calculated in advance, and then the graphics processor 270 switches between them for display at the appropriate time. This will result in relatively slow updating of the actual structure if the applications program 230 revises the primary database including rotations of the structure relative to the screen-space (i.e. by incorporating 230 and 250 into one unit). Since the sequence of images is known in advance, the buffer images can be updated in an optimal order.

Figure 14:
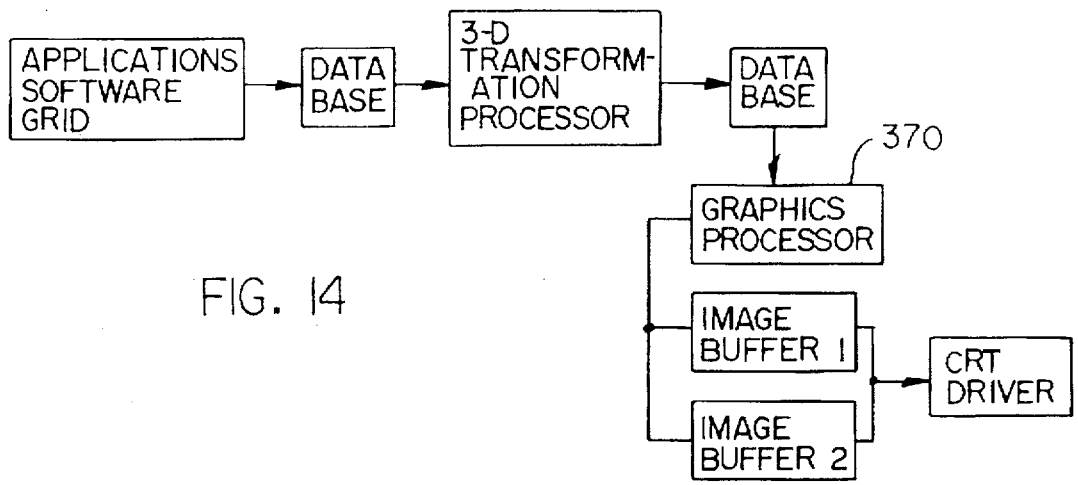

A high speed graphics processor 370 may be able to create one image while another is being displayed; the CRT (or imaging device) driver will switch between the image buffers at the proper time. Such a system is depicted in FIG. 14. As the structural complexity increases, the persistence of the perception of spatial structure increases after each shift. Consequently, the more complex structures which require more processing time often will be able to use the dual buffering system of FIG. 14, as more time is available to calculate each image.

Figure 15:
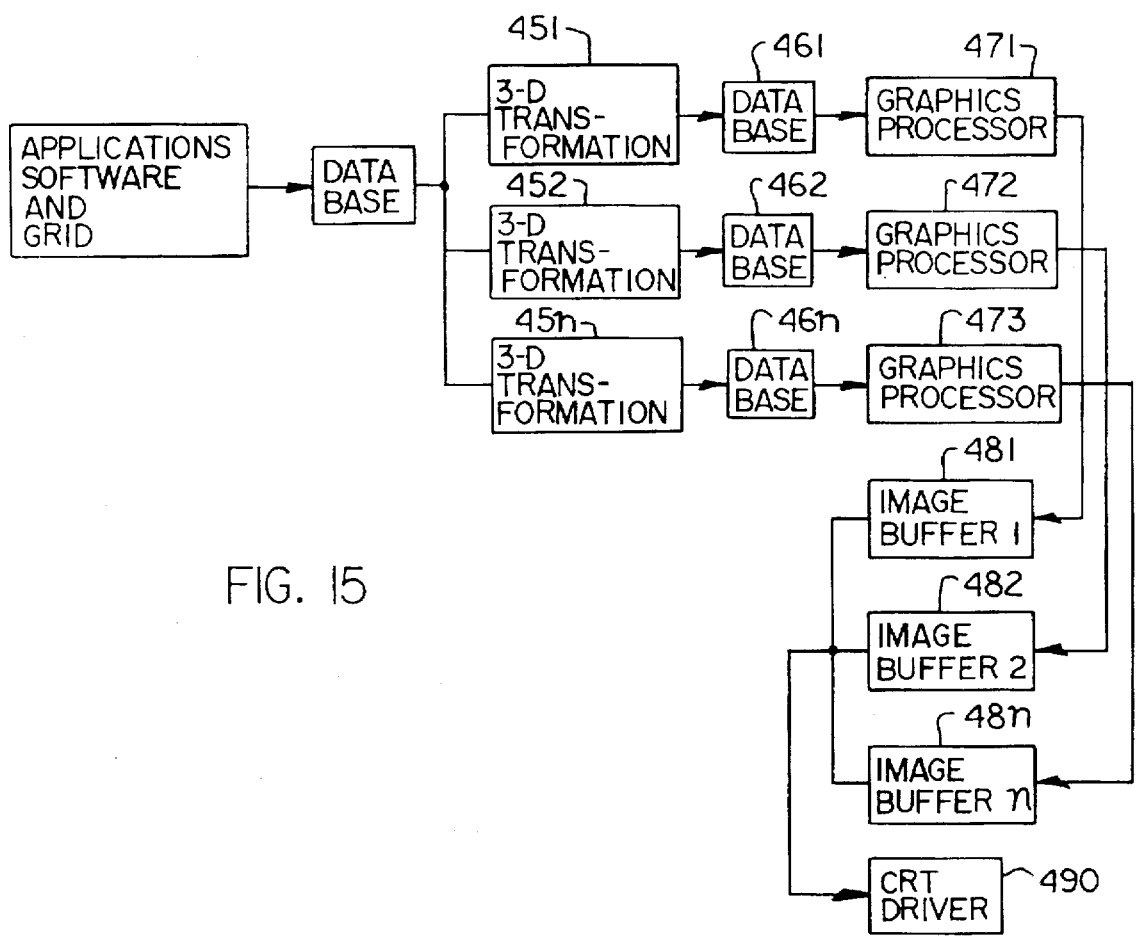

Animation is created when changes in the displayed structure occur asynchronously (not necessarily at the same time) with the present invention's shifts. If the 3-D database transformation and graphics processor have adequate speed, the two-buffer system shown in FIG. 14 may be adequate for animation. For highly complex structures and/or animation, a fully parallel system can be used, as shown in FIG. 15. This has a separate channel, a, b, . . . n for each shift position. This includes parallel 3-D transformation processors 451, 452, . . . 45n, transformed databases (memory) 461, 462, . . . 46n, graphics processors 471, 472, . . . 47n, and image memory buffers 481, 482, . . . 48n. A controller, such as the CRT driver 490 selects each image buffer to display as required. The image generation is thus independent of the image display. Obviously, a system with fewer than n parallel multiple processors and image buffers can be used, which would still be able to present spatial displays of animated structures.

Since randomness (or apparent randomness) is an helpful feature of this process, if processing time occasionally delays a shift, it will normally be undetectable.

CRT Display Considerations

There are two principal types of cathode ray tubes (CRT); cursive and raster-scanned. CRTs produce images on screens by exciting phosphors to give off visible photons in response to being bombarded with an electron beam. The phosphors are on the inside surface of an evacuated glass chamber with the electron gun. The position and intensity of the electron beam is manipulated with electrical and/or magnetic fields. A cursive CRT draws (or "writes") on the screen by freely manipulating the x and y position of an electron beam such that it can be moved to any position on the display screen. As the beam is moved about, its intensity can be modulated in the range between full intensity and off. The resolution of such a display is defined by the degree of accuracy with which the beam can be steered. It is possible to produce a finer resolution of the position of the beam on the screen than the size of the dot or line drawn by the beam. In other words, the beam-spot on the screen can be moved by a fraction of a spot diameter. Cursive displays are also known as x-y, vector, stroke-vector, vector graphics, and calligraphic displays.

A raster-scanned CRT sweeps the electron beam in a repetitive path which covers the entire screen. The intensity of the beam is modulated as it is swept. Typically, the beam is repeatedly swept horizontally over the phosphors with the beam modulated in one direction of sweep and turned off during the return, or flyback, period; thus a line is swept. At a lower frequency than the horizontal sweep, the horizontal line is swept vertically over the phosphors. In this manner, the entire surface of the screen is covered during one or two vertical sweeps. An image is formed on the raster-scanned CRT by modulating its intensity as a function of position on the screen. The number of horizontal sweeps per vertical sweep defines the vertical resolution of the image. The speed with which the swept beam can be modulated defines the horizontal resolution. A normal engineering or scientific workstation monitor (CRT monitor) will be mapped into a rectangular array of cells, called "pixels," whose number is determined by the vertical resolution and the modulation frequency limit. Minimum pixel size is limited to the beam spot diameter. A typical raster scanned workstation monitor will have a resolution of at least 1024×768 pixels.

Some applications of the present invention use workstations and enhanced graphics personal computers; consequently, it is desirable to use pixel-mapped displays. The display process of the present invention will produce small changes in line angles. For instance, if one end of a line lies in the neutral plane and the other end is not on the neutral plane, then the shifts will cause one end of the line to shift relative to the other. Some of these shifts will produce small changes in the orientation of the line upon the screen. If lines are plotted as on/off states of pixels, there will be limitations to the depth resolution of the display, although limited depth display is still possible.

Figure 16:
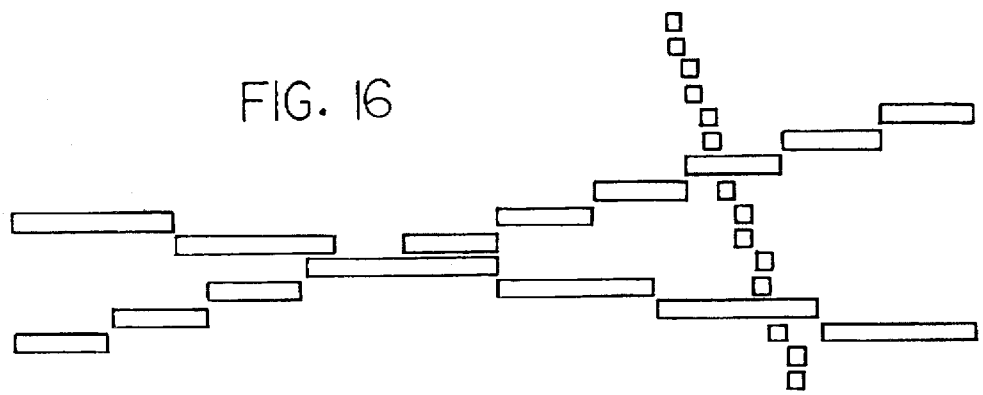
FIG. 16 is a conceptual depiction of diagonal straight lines as displayed by a pixel-based raster display, illustrating the formation of "jaggies.

Most computer generated displays use CRT monitors which are raster-scanned, or pixel, displays. A line cannot be simply "drawn" on the screen; instead a group of pixels must be modulated to produce an approximation of a line in the displayed array. If the pixels are either on or off, then a stepped approximation to lines is produced. For slanted lines, this produces a series of steps called "jaggies" as shown in FIG. 16. This is called aliasing and is characteristic of raster displays. Stroke vector displays do not have this problem. If the pixel map is of high resolution, the steps will be less visible, particularly if the lines plotted are more than one pixel wide. Small changes in line angles will produce significant changes in the stepped structure of discrete pixel lines.

Figure 17:
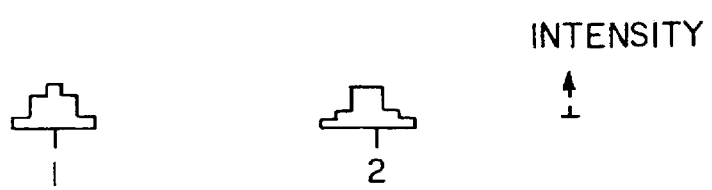
" and FIG. 17 is a schematic illustration of pixel brightnesses in a center of brightness raster display, usable with the present invention to reduce the appearance of "jaggies."

A monochrome or color CRT display system which is capable of intensity modulation can use a line blurring algorithm or procedure to achieve anti-aliasing. This is accomplished by generating an image in which each pixel (image element) is a weighted average of the intensities and colors of the surrounding pixels. An improved method uses sub-pixel addressing and center-of brightness (COB) plotting. A line is plotted not as a series of dots, but as profiles which define a center of brightness amongst several pixels, as is shown in FIG. 17. By manipulating the relative brightness of several pixels, the COB can be shifted by a fraction of a pixel. In FIG. 16 the COB of the profile is shifted by ½ pixel width between 1 and 2. This technique can also be applied to edges. It is the contrast of lines and edges with their background which defines them; consequently, this same technique can be used in reverse for dark lines against light backgrounds, and analogous gradients determined between colors. Anti-aliasing allows plotting straight COB lines and edges.

The small shifts coupled with COB line plotting will increase the functional resolution of the pixel mapped CRT display. A pixel map can be considered a local averaging system and can be compared with a video camera. Each pixel in a video camera records the average intensity and, if applicable, color, falling on it. The finest resolution capable is of a feature the size of a single pixel in the image plane. It is well known that a stationary image viewed through a stationary grid of "pixelizing" medium which presents the average intensity and color falling on an array of elements will have a resolution limited to the pixel size. If the array is moved relative to the image, the resolution for edge and line resolution is increased. The human visual system is capable of perceiving offsets between line segments which are considerably less in size in the retinal image than the size of the photoreceptors. In humans, this is termed "hyperacuity." Gridded optical systems, such as fiber optic systems, sometimes have dither (small lateral motions) introduced to either the image or the array to increase edge location resolution. The combination of anti-aliasing through COB plotting and the small motions of the shifts produced with the present invention will produce an increased perceived resolution in a pixel or arrayed display. This is similar to the phenomenon that a photograph of a television screen image appears grainier than the time-varying scene on the screen does.

A satisfactory 3-D spatial structure can be displayed on a raster scanned workstation CRT monitor using the present invention. Thus, it can be a cost effective and useful method for displaying engineering, scientific, and biomedical structures in three dimensions without the use of special eye glasses and/or CRTs. The CRT is preferably of moderate to high (640×350 minimum) resolution with intensity modulation. The phosphor persistence should be short enough (10–20 ms) that no overlap of two successive images at the same location will occur. The preferred CRT raster scanned display will have at least 1024×768 pixels, 5 bits (32 levels) of intensity per color and will be scanned in a non-interlaced mode with a screen refresh scan rate of at least 50 Hz. The 50 Hz vertical sweep rate requirement is to prevent the perception of flicker in the short persistence phosphor, as this frequency is considered to be above the flicker fusion frequency of human vision.

A stroke vector display preferably has as high a resolution level as possible; 10 bits (1024) of x and y resolution appear to be the minimum. Linearity of the drives is not required, only monotonicity. A minimum of 3 bits (8 levels) of intensity modulation enhances the display, higher positioning resolution and finer intensity modulation will produce improved 3-D display characteristics.

The present invention may be used in both cursive and raster-scanned CRTs. It does not alter the utility of the CRT in a conventional, flat mode. In fact, it is possible to intermix the two, allocating part(s) of the screen to each display mode. The computer- or controller-based three-dimensional display system can be achieved in a wide range of configurations with varying capabilities from monochrome nonanimated systems to fully animated color systems capable of displaying complex structures.

WORKING EXAMPLE

In one embodiment a 19" (diagonal measurement) monochrome green phosphor Hewlett-Packard (HP) 1310B cursive CRT is driven by a Hewlett-Packard 1351 Graphics Generator. The graphics generator can store a set of vector end points and beam intensity vectors (drawing in straight lines between the end points) and built in alphanumeric character vector drivers, all of which make up a screen image. The HP 1351 cycles through the set of vectors repeatedly, producing a stable image on the screen. The screen is fitted with an antiglare shield. Although the HP 1351 is capable of storing several screens of information, its design does not permit a flickerless rapid change of screen image. As a consequence, only one image buffer in the CRT controller is used; thus it functions as the CRT driver. It has a beam position resolution of 1020×1020 (10 binary bits), and 7 levels of brightness plus off (3 bits). Its image buffer contents are changed directly from the control computer. The HP 1351 was controlled by a Digital Equipment Corporation (DEC) PDP-11-03L minicomputer. Communication between the PDP-11 and the HP 1351 was over a high speed (500 Kbyte/sec.) parallel communications bus utilizing a direct memory access (DMA) card. The program in the PDP-11 was written in FORTRAN and assembly languages.

Databases describing the cell design shown in FIG. 7 as a part of a three-dimensional scene were generated. The computer reads the information from the selected databases and uses the number of shift positions (n), the shift radius (A), the horizontal ($O_x$) and vertical ($O_y$) offsets, and the perspective (V) to generate n image vector sets in random access memory (RAM). These n image vector sets are generated before starting the continuous display sequence. These n image vector sets are the equivalent to the n image buffers depicted in FIG. 13. The system is capable of limited real-time animation of the scene contents. Four or eight shift positions are used (n=4, 8). Base times of 80 ms to 240 ms are typically used. The shift sequences and relative timings are read from a data file. A hardware/software timer is used to control the sequencing of images to the HP 1351 to produce the 3-D display. Complex fully hierarchical cell structures may be used, as well as simplified or absent cell structures. The +z direction is out of the screen toward the viewer. Each line is drawn in a single intensity, but those lines which are greater in depth (z) had lower intensities than those in front. This technique of decreasing the intensity contrast of more distant features is called "depth cuing" and is a type of monocular cue.

This system is capable of displaying "wireform" structures in space. It is used to display isolated alphanumerics embedded in a full hierarchical cell structure and a molecular model wireform backbone with no cell structure. The molecular model has a great deal of inherent structure. The molecular model space is also subjected to considerable shear. The monitor has a resolution of 1020×1020. The 3-D display neutral plane has dimensions of 900×900. The offsets (in resolution units) were $O_x=-48$, and $O_y=-96$. The shift radius (A) is normally 3. The resolution limit of the CRT driver limits the number of defined vector end point levels to 7 due to the limit of the shift radius resolution.

While numerous conceptual and several specific procedures and apparatus have been disclosed herein, it is not the intention of applicant to be limited to the precise scope of the invention as described, but rather, the invention is to be construed broadly in accordance with the claims hereof.

What is claimed is:

1. A method of displaying a three dimensional view on a substantially flat viewing surface to enable human perception of three dimensions comprising the steps of:
   a. providing a database of information about the view to be displayed in which a configuration of the view is recorded with position parameters in three dimensions including sufficient data to portray the view in at least three positions,
   b. displaying the view on the surface to both eyes of a human viewer with points on the surface making up the displayed view determined as a direction of sight rendering of the view derived from the position parameters recorded in the database,
   c. using a microprocessor repeatedly to derive from the data sufficient information concerning the displayed view to alter and redisplay points of the surface, at a saccade-like rate, corresponding to at least three positions in accordance with variations in the direction of sight in a pattern of discrete changes that are:
      i) perceptually unpredictable in order,
      ii) perceptually unpredictable in length of time displayed for each displayed view,
      iii) less than $d_{max}$, where $d_{max}$ is the maximal disparity between successive images which maintain human perceptual correspondence, and
      iv) synchronous over the entire displayed view;
   whereby motion parallaxes are displayed perceptibly to both eyes of the human viewer, which enables the human viewer to achieve a perception of spatial structure in the view, whether movement of the view is occurring or not.

2. A method of displaying a three dimensional view made up of features on a two dimensional surface to enable human perception of the threedimensionality of the features comprising the steps of
   a. rendering an image of the view as points on the surface; and
   b. creating a display of a perceptible three-dimensional coordinate display space in which the displayed view is rendered by modifying the view as rendered including altering and redisplaying points of the surface, at a saccade-like rate, corresponding to at least three positions in accordance with variations in the direction of sight in a pattern of discrete changes that are:
      i) perceptually unpredictable in order,
      ii) perceptually unpredictable in length of time displayed for each displayed view,
      iii) less than $d_{max}$, where $d_{max}$ is the maximal disparity between successive images which maintain human perceptual correspondence, and
      iv) synchronous over the entire displayed view;
   whereby motion parallaxes are displayed perceptibly to both eyes of the human viewer, which enables the human viewer to achieve a perception of spatial structure in the view, whether movement of the view is occurring or not.

3. A method as claimed in claim 2 wherein step a comprises rendering the image as a view of a database selected from the group consisting of a. a computer-aided-design database;
   b. a scientific visualization database;
   c. a molecular modelling database;
   b. a medical imaging database;
   e. a computer-aided-tomography scan;
   f. a nuclear magnetic resonance database;
   g. a dimensionalized relationship of variables;
   h. a database useful for air traffic control;
   i. a database useful for military situation displays;
   j. a videogame; and
   k. video data.

4. A method as claimed in claim 2 wherein step a comprises generating a view of a data encoded in a RAM, ROM, PROM or EPROM.

5. A method as claimed in claim 2 wherein step a comprises mapping data through mathematical transformations which provide rotations, translations or scaling.

6. A method as claimed in claim 2 wherein step a comprises compiling a database from data having three dimensional information about features of the view derived from analysis of differences between multiple optically-obtained depictions of a scene to be displayed.

7. A method as claimed in claim 6 wherein the multiple depictions are obtained from multiple aperture locations of video camera means.

8. A method as claimed in claim 6 wherein the multiple depictions are obtained from multiple aperture locations of motion picture camera means.

9. A method as claimed in claim 6 wherein the motion parallax is obtained by small non-cumulative microshears of features of the view.

10. A method as claimed in claim 6 wherein the motion parallax is obtained by small, non-cumulative micro-rotations of features of the view.

11. A method as claimed in claim 2 wherein said rendering step includes rendering an image of the view as seen from a direction of sight and wherein step b includes applying an offset shift to the view whereby features are shifted in position in a direction substantially perpendicular to the direction of sight, with the amount of shift being proportional to the distance from a frontmost plane of the view to be displayed.

12. A method as claimed in claim 11 wherein the direction of the shift includes horizontal and vertical components greater than zero.

13. A method as claimed in claim 2 wherein the database includes x, y and z dimensions and the x and y dimensions are used to define the plane of the surface on which the view is displayed and step b includes applying a static offset shift to the view whereby features are shifted in position in a direction parallel to the x-y plane, with the amount of shift being directly proportional to the z component of the feature displayed.

14. A method as claimed in claim 2 wherein step b includes applying a monocular depth cue to the view.

15. A method as claimed in claim 14 wherein the depth cue comprises perspective in which features further from the viewer along the direction of sight of the view are reduced in size to a greater extent than features closer to the viewer.

16. A method as claimed in claim 14 wherein the depth cue comprises variable intensity such that features of the view further from the viewer along the direction of sight are displayed with less intensity than features closer to the viewer.

17. A method as claimed in claim 14 wherein the depth cue comprises variable contrast such that features further from the viewer along the direction of sight are displayed with less contrast to their environs than features closer to the viewer.

18. A method as claimed in claim 16 wherein the depth cue comprises variable contrast such that features further from the viewer along the direction of sight are displayed with less contrast to their environs than features closer to the viewer.

19. A method as claimed in claim 2 wherein in step a, a regular array of features is included with the view to be displayed to provide a frame of reference to enhance the viewer's perception of the three dimensions in which the view is situated.

20. A method as claimed in claim 2 wherein step b includes modifying such displayed view repeatedly.

21. A method as claimed in claim 2 wherein step b includes modifying such displayed view repeatedly at intervals similar to the intervals between eye saccades.

22. A method as claimed in claim 2 further comprising
 c. the database including x, y and z dimensions
 d. the x and y dimensions being used to define the plane of the surface on which the view is displayed and the z dimension is at least approximately along a direction of sight through the surface
 e. a plane substantially parallel to the surface being considered as a neutral plane and
 f. step b further comprising periodically shifting the perceived direction of sight through a point on the neutral plane, so that points on the displayed view representing features closer to the viewer along the z dimension than the neutral plane are shifted in one direction and points further than the neutral plane are shifted in the opposite direction and all such points on the surface are shifted substantially simultaneously.

23. A method as claimed in claim 22 wherein the view is displayed as situated in a space and said motion parallax is produced by small, non-cumulative shears of the space.

24. A method as claimed in claim 23 wherein step a comprises compiling a database from data having three dimensional information about features of the view derived from analysis of differences between multiple optically-obtained depictions of a scene to be displayed.

25. A method as claimed in claim 24 wherein the multiple depictions are obtained from multiple aperture locations of video camera means.

26. A method as claimed in claim 24 wherein the multiple depictions are obtained from multiple aperture locations of motion picture camera means.

27. A method as claimed in claim 22 wherein the view is displayed as situated in a space and said motion parallax is produced by small, non-cumulative rotations of the space.

28. A method as claimed in claim 27 wherein the shifts of points representing a feature are of magnitude determined by the magnitude of the angle of the change in direction of sight and the distance of the plane of the feature from the neutral plane.

29. A method as claimed in claim 28 wherein the shifts of the points on the surface take place in an amount less than the amount which would result in solid features of the view appearing to break up.

30. A method as claimed in claim 29 wherein the direction of sight varies at intervals similar to the intervals between human eye saccades.

31. A method as claimed in claim 27 wherein the shifts take place in directions having both x and y non-zero components.

32. A method as claimed in claim 27 wherein the shifts are between points arrayed in a closed path on the surface so that after a complete traversal of the path by a sequence of shifts the points have no net displacement.

33. A method as claimed in claim 27 wherein shifts take place after a period correlated with the magnitude of the last shift.

34. A method as claimed in claim 32 wherein the shifts from one point on the path to another are in a sequence such that the viewer's visual system cannot predict the sequence.

35. A method as claimed in claim 32 wherein at least three points are on the path.

36. A method as claimed in claim 22 wherein the shifts of points representing a feature are of magnitude determined by the magnitude of the angle of the change in direction of sight and the distance of the plane of the feature from the neutral plane.

37. A method as claimed in claim 36 wherein the shifts of the points on the surface take place in an amount less than the amount which would result in solid features of the view appearing to break up.

38. A method as claimed in claim 37 wherein the direction of sight varies at a rate comparable with human saccades.

39. A method as claimed in claim 35 wherein the shifts take place in directions having both x and y non-zero components.

40. A method as claimed in claim 35 wherein the shifts are between points arrayed in a closed path on the surface so that after a complete traversal of the path by a sequence of shifts the points have no net displacement.

41. A method as claimed in claim 35 wherein shifts take place after a period correlated with the magnitude of the last shift.

42. A method as claimed in claim 40 wherein the shifts from one point on the path to another are in a sequence such that the viewer's visual system cannot predict the sequence.

43. A method as claimed in claim 40 wherein at least three points are on the path.

44. A method as claimed in claim 23 wherein the shifts of points representing a feature are of magnitude determined by the magnitude of the angle of the change in direction of sight and the distance of the plane of the feature from the neutral plane.

45. A method as claimed in claim 44 wherein the shifts of the points on the surface take place in an amount less than the amount which would result in solid features of the view appearing to break up.

46. A method as claimed in claim 45 wherein the direction of sight varies at a rate comparable with human saccades.

47. A method as claimed in claim 23 wherein the shifts take place in directions having both x and y non-zero components.

48. A method as claimed in claim 23 wherein the shifts are between points arrayed in a closed path on the surface so that after a complete traversal of the path by a sequence of shifts the points have no net displacement.

49. A method as claimed in claim 23 wherein shifts take place after a period correlated with the magnitude of the last shift.

50. A method as claimed in claim 48 wherein the shifts from one point on the path to another are in a sequence such that the viewer's visual system cannot predict the sequence.

51. A method as claimed in claim 48 wherein at least three points are on the path.

52. An apparatus for displaying a three dimensional view on a two dimensional surface to enable human perception of three dimensions comprising:
 a. a database storage medium storing a database of information about the view to be displayed in which a configuration of the view is recorded with position parameters in three dimensions, including sufficient data to portray the view in at least three positions, b. a two dimensional surface visible to both eyes of a human viewer, c. a display device for displaying on the surface points making up the view determined as a direction of sight rendering of the view derived from the position parameters recorded in the database, d. apparatus operatively interposed between the database and the surface to modify the displayed view including altering and redisplaying points of the surface, at a saccade-like rate, corresponding to at least three positions in accordance with variations in the direction of sight in a pattern of discrete changes that are:
  i) perceptually unpredictable in order,
  ii) perceptually unpredictable in length of time displayed for each displayed view,
  iii) less than $d_{max}$, where $d_{max}$ is the maximal disparity between successive images which maintain human perceptual correspondence, and
  iv) synchronous over the entire displayed view;

whereby motion parallaxes are displayed perceptibly to both eyes of the human viewer, which enables the human viewer to achieve a perception of spatial structure in the view, whether movement of the view is occurring or not.

53. An apparatus for displaying a three dimensional view made up of features comprising a. a two dimensional surface and means for rendering the view as points thereon and b. means for creating a display on said surface of a perceptible three-dimensional coordinate display space in which the displayed view is rendered, including means which modifies the view as rendered including altering and redisplaying points of the surface, at a saccade-like rate, corresponding to at least three positions in accordance with variations in the direction of sight in a pattern of discrete changes that are:
  i) perceptually unpredictable in order,
  ii) perceptually unpredictable in length of time displayed for each displayed view,
  iii) less than $d_{max}$, where $d_{max}$ is the maximal disparity between successive images which maintain human perceptual correspondence, and
  iv) synchronous over the entire displayed view;

whereby motion parallaxes are displayed perceptibly to both eyes of the human viewer, which enables the human viewer to achieve a perception of spatial structure in the view, whether movement of the view is occurring or not.

54. An apparatus as claimed in claim 53 wherein said means for rendering comprises a database selected from the group consisting of
  a. a computer-aided-design database;
  b. a scientific visualization database;
  c. a molecular modelling database;
  d. a medical imaging database;
  e. a computer-aided-tomography scan;
  f. a nuclear magnetic resonance database;
  g. a dimensionalized relationship of variables;
  h. a database useful for air traffic control;
  i. a database useful for military situation displays;
  j. a videogame; and
  k. video data.

55. An apparatus as claimed in claim 53 further comprising a database of data on the view of a data encoded in a RAM, ROM, PROM or EPROM.

56. A method as claimed in claim 2 wherein the discrete changes are perceptually random in direction.

57. A method as claimed in claim 2 wherein said discrete changes are perceptually random in timing.

58. A method as claimed in claim 2 wherein said discrete changes are perceptually random in amplitude.

59. A method as claimed in claim 2 wherein said discrete changes are perceptually random in amplitude, and the amplitude of a change affects the timing of the following change.

60. An apparatus as claimed in claim 53 wherein the discrete changes are perceptually random in direction.

61. An apparatus as claimed in claim 53 wherein said discrete changes are perceptually random in timing.

62. An apparatus as claimed in claim 53 wherein said discrete changes are perceptually random in amplitude.

63. An apparatus as claimed in claim 53 wherein said discrete changes are perceptually random in amplitude, and the amplitude of a change affects the timing of the following change.

64. A method as claimed in claim 1 wherein the discrete changes in the variation in the direction of sight have a magnitude and the length of time each view is displayed correlates with the magnitude of a prior discrete change in the direction of sight.

65. A method as claimed in claim 2 wherein the discrete changes in the variation in the direction of sight have a magnitude and the length of time each view is displayed correlates with the magnitude of a prior discrete change in the direction of sight.

66. An apparatus as claimed in claim 52 wherein the discrete changes in said variation in the direction of sight have a magnitude and said length of time each view is displayed correlates with the magnitude of a prior discrete change in the direction of sight.

67. An apparatus as claimed in claim 53 wherein the discrete changes in said variation in the direction of sight have a magnitude and said length of time each view is displayed correlates with the magnitude of a prior discrete change in the direction of sight.

68. A method as claimed in claim 1 wherein the surface has two dimensions and the pattern of discrete changes includes variations in the direction of sight having components parallel to the two dimensions.

69. A method as claimed in claim 2 wherein the surface has two dimensions and the pattern of discrete changes includes variations in the direction of sight having components parallel to the two dimensions.

70. An apparatus as claimed in claim 52 wherein said surface has two dimensions and said pattern of discrete changes includes variations in said direction of sight having components parallel to said two dimensions.

71. An apparatus as claimed in claim 53 wherein said surface has two dimensions and said pattern of discrete changes includes variations in said direction of sight having components parallel to said two dimensions.

* * * * *